(12) United States Patent
Mak (10) Patent No.: US 12,547,014 B2
(45) Date of Patent: Feb. 10, 2026

(54) SPRING STABILIZER SYSTEM AND LENS STABILIZING-FOCUSING DEVICE USING SAME

(71) Applicant: VISTA INNOTECH LIMITED, Hong Kong (HK)

(72) Inventor: Lin Chi Mak, Hong Kong (HK)

(73) Assignee: VISTA INNOTECH LIMITED, Hong Kong (HK)

( * ) Notice: Subject to any disclaimer, the term of this patent is extended or adjusted under 35 U.S.C. 154(b) by 394 days.

(21) Appl. No.: 18/136,341

(22) Filed: Apr. 19, 2023

(65) Prior Publication Data

US 2023/0251501 A1 Aug. 10, 2023

Related U.S. Application Data

(63) Continuation-in-part of application No. PCT/CN2021/134188, filed on Nov. 30, 2021.

(30) Foreign Application Priority Data

Dec. 31, 2020 (CN) .......................... 202011644461.4

(51) Int. Cl.
*G02B 27/64* (2006.01)
*F16F 15/06* (2006.01)
*G03B 5/00* (2021.01)

(52) U.S. Cl.
CPC ............ *G02B 27/646* (2013.01); *F16F 15/06* (2013.01); *G03B 5/00* (2013.01)

(58) Field of Classification Search
CPC ....... G02B 27/646; G02B 27/64; F16F 15/06; G03B 5/00; G03B 5/02; G03B 13/36;
(Continued)

(56) References Cited

U.S. PATENT DOCUMENTS

2010/0165131 A1* 7/2010 Makimoto ............. H04N 23/68
359/557

FOREIGN PATENT DOCUMENTS

CN 102934021 A 2/2013
CN 105492952 A 4/2016
(Continued)

OTHER PUBLICATIONS

International search report of PCT Patent Application No. PCT/CN2021/134188 issued on Feb. 28, 2022.

*Primary Examiner* — Arnel C Lavarias (57) ABSTRACT

Disclosed are a spring stabilizer system and a lens stabilizing-focusing device using the system. The spring stabilizer system includes at least two stabilizing springs, where the stabilizing springs each include a fixed portion, an elastic connecting arm, and a movable arm; a first connecting groove is formed in the fixed portion; one end of the elastic connecting arm is connected to the first connecting groove; a ratio of a length of a vertical midline of the elastic connecting arm to a maximum distance from an edge of the elastic connecting arm to the vertical midline is greater than 5:1; a ratio of a width of the elastic connecting arm to a thickness of the elastic connecting arm is not less than 2:1; a second connecting groove is formed in the movable portion; and the second connecting groove is connected to the other end of the elastic connecting arm.

17 Claims, 8 Drawing Sheets

(58) Field of Classification Search
CPC ........ G03B 2205/00; G03B 2205/0007; G03B 2205/0015; G03B 2217/005; H04N 23/57; H04N 23/68; H04N 23/682; H04N 23/685; H04N 23/687
USPC ....... 359/557, 554; 250/201.1, 201.2, 201.4; 348/208.99, 208.2, 208.12; 396/52, 55
See application file for complete search history.

(56) References Cited

FOREIGN PATENT DOCUMENTS

| | | |
|---|---|---|
| CN | 107450251 A | 12/2017 |
| CN | 214586334 U | 11/2021 |
| JP | 2015018268 A | 1/2015 |

\* cited by examiner

SPRING STABILIZER SYSTEM AND LENS STABILIZING-FOCUSING DEVICE USING SAME

CROSS REFERENCE TO RELATED APPLICATIONS

The present application is a Continuation-In-Part Application of PCT Application No. PCT/CN2021/134188 filed on Nov. 30, 2021, which claims the benefit of Chinese Patent Application No. 202011644461.4 filed on Dec. 31, 2020. All the above are hereby incorporated by reference in their entirety.

TECHNICAL FIELD

The present disclosure relates to a technical field of gimbal stabilizer (GS), and in particular to a spring stabilizer system and a lens stabilizing-focusing device using the spring stabilizer system.

BACKGROUND

In recent years, compact mobile devices having a photographing function, including aerial cameras, sports cameras, and automobile data recorders, have been popularized and applied to more fields. The compact mobile device includes at least one compact camera module. Hence, there are a huge market and a rising trend for a compact camera module.

When the compact mobile device is used to take photos and films, the photos and films are prone to blurs or drifts due to external vibrations, with an undesirable quality. The problem is particularly severe in the case of intense vibrations or low-light scenarios. In order to solve problems above, different compact stabilizer techniques are emergent in markets. It is highly desirable to improve image quality by mechanically compensating for the blurs or drifts arising from the vibrations. The mechanical method achieves a stabilization effect by translating a set of lenses or rotating a set of lenses and an image sensor through a stabilizing actuator. Generally, a rotational mechanical method has a better stabilization effect over a translational mechanical method.

A rotational stabilizing actuator is provided with a mechanical structure to realize a multi-axis rotational degrees-of-freedom (DOF) of a movable structure such as the lens and the image sensor. In order to mitigate impacts of external forces from acceleration in different directions or gravities on the movable structure in the actuator, there is no translational degrees-of-freedom (DOF) for the mechanical structure. In addition, the mechanical structure is desired to have a good anti-drop ability, and can withstand any drop in normal use of the compact mobile device.

The Chinese Patent Application No. CN 201180028200.2 discloses an optical unit with a shake correcting function. The optical unit with a shake correcting function includes a plurality of permanent magnets which are provided on an outer peripheral face of the movable module (photographing unit) at positions separated in a circumferential direction around an optical axis L of the optical element, and a sheet-shaped coil which is extended in a circumferential direction in the fixed body and is integrally provided with a plurality of coil parts facing the permanent magnets. A terminal part is disposed on an outer face of the sheet-shaped coil which is a side opposite to a side facing the permanent magnet. According to this structure, electrical connection with the coil parts can be performed easily.

The Chinese Patent Application No. CN 201480037511.9 discloses a lens driving apparatus, including a fixed assembly, the fixed assembly including a base frame; a movable assembly, the movable assembly including a lens holder; a set of magnets surrounding the movable assembly; three sets of coils; and a spring system attached between the movable assembly and the fixed assembly and configured to support the movable assembly and form a suspension system to allow the movable assembly to move along a first, a second, and a third orthogonal axes. The lens holder is configured to hold a lens unit, the third axis is parallel to an optical axis of the lens unit, while the first and second axes are respectively perpendicular to the third axis.

The above technical solutions are defective for a ball connecting the fixed assembly and the movable assembly in the actuator. The ball causes a nonlinear frictional force in movement, which will affect the stabilization effect. Moreover, conventional spring has a poor anti-drop ability and suffers from an external force easily to affect performance of the actuator.

SUMMARY

An objective of the present disclosure is to provide a spring stabilizer system and a lens stabilizing-focusing device using the spring stabilizer system. The present disclosure can make full use of a limited space in a camera module, and compensate differences of spring constants in different directions from other components, thereby achieving a better stabilization effect.

In order to solve the above-mentioned technical problems, the present disclosure provides a spring stabilizer system. The spring stabilizer system includes at least two stabilizing springs, where the stabilizing springs each include a fixed portion, an elastic connecting arm, and a movable arm; a first connecting groove is formed in the fixed portion; one end of the elastic connecting arm is connected to the first connecting groove; a ratio of a length of a vertical midline of the elastic connecting arm to a maximum distance from an edge of the elastic connecting arm to the vertical midline is greater than 5:1; a ratio of a width of the elastic connecting arm to a thickness of the elastic connecting arm is not less than 2:1; a second connecting groove is formed in the movable portion; and the second connecting groove is connected to the other end of the elastic connecting arm.

Preferably, the spring stabilizer system is provided with a centerline; an included angle between the vertical midline of the stabilizing spring and the centerline is less than 10°; the centerline and the vertical midline of the stabilizing spring form a reference plane; and a minimum included angle between a plane where the stabilizing spring is located and the reference plane is less than 20°.

Preferably, of the at least two stabilizing springs, a ratio of the width of the elastic connecting arm of one of the stabilizing springs to the width of the elastic connecting arm of the other one of the stabilizing springs is not less than 10:9.

Preferably, the fixed portion includes one side provided with a first locating groove, and another side provided with a first clamping groove; and the movable portion includes one side provided with a second locating groove at a same side as the first locating groove, and another side provided with a second clamping groove at a same side as the first clamping groove.

Preferably, the elastic connecting arm is a bar-shaped elastic connecting arm.

Preferably, the elastic connecting arm is a wave-shaped elastic connecting arm.

Preferably, the elastic connecting arm is a sheet-shaped elastic connecting arm.

The present disclosure further provides a lens stabilizing-focusing device using the stabilizing spring system, including:

- a fixed structure including a locating seat and an outer casing, where the locating seat is provided in the outer casing; and a conductive structure is provided on the locating seat; and
- the fixed portion of each of the stabilizing springs is connected to the locating seat;
- a stabilizing structure including a sensor carrier, at least one set of stabilizing magnets, and at least two sets of stabilizing coils, where the stabilizing magnets are fixed in the outer casing; the sensor carrier is connected to the movable portion of the stabilizing spring; the stabilizing coils are provided on the sensor carrier; and the stabilizing coils correspond to the stabilizing magnets;
- a focusing structure including a lens carrier, at least one set of focusing magnets, and at least one set of focusing coils, where the focusing magnets are fixed on an inner wall of the outer casing; the lens carrier is provided on the sensor carrier, and has at least a spatial translational DOF; the focusing coils are provided at a periphery of the lens carrier; and the focusing coils are opposite to the focusing magnets;
- a lens provided on the lens carrier, where an included angle between the vertical midline of the elastic connecting arm and an optical axis of the lens is less than 10°;
- a module housing connected to a bottom end of the fixed structure;
- a sensor circuit board provided in the module housing, and connected to the fixed structure and the stabilizing structure; and
- an image sensor provided on the sensor circuit board.

Preferably, the conductive structure is provided on the locating seat; the stabilizing coils are electrically connected to the conductive structure; the stabilizing spring is made of a conductive material; and the stabilizing spring includes one end electrically connected to the sets of stabilizing coils, and the other end connected to the conductive structure on the locating seat.

Preferably, the optical axis of the lens coincides with the centerline of the spring system.

The present disclosure has the following beneficial effects:

(1) The fixed portion is connected to the movable portion through the elastic connecting arm, which facilitates a camera module to realize a multi-axis DOF, and reduces a spring constant and stabilizing power consumption.

(2) The stabilizing spring system provided by the present disclosure is provided with the fixed portion, which can be connected to the fixed structure in the camera module. Without compromising the DOF of the movable portion, the stability and anti-drop ability of the whole circuit board structure are ensured, and the reliability in the case of the drop is further enhanced.

(3) The lens stabilizing-focusing device provided by the present disclosure involves neither complicated production such as excessive laser cutting, nor complicated assembly, thereby reducing the production cost and reject ratio, and improving the production efficiency.

(4) The present disclosure makes full use of a limited space of the device, with a smaller size, a simpler structure, and a lower cost.

(5) The spring system in the present disclosure can effectively reduce a roll-axis spring constant (namely a spring constant in a turning direction around the optical axis), and compensate a large roll-axis spring constant caused by other elastic components (such as an elastic portion in a sensor circuit board), thereby achieving more desirable stabilization and power-saving effects in a roll axis.

REFERENCE NUMERALS

1: fixed structure, 101: locating seat, 1011: conductive structure, 102: outer casing, 103: groove, 2: stabilizing spring, 201: fixed portion, 2011: first connecting groove, 2012: first locating groove, 2013: first clamping groove, 202: movable portion, 2021: second connecting groove, 2022: second locating groove, 2023: second clamping groove, 203: elastic connecting arm, 204: vertical midline, 3: stabilizing structure, 301: sensor carrier, 302: stabilizing coil, 303: stabilizing magnet, 4: focusing structure, 401: lens carrier, 402: focusing coil, 403: focusing magnet, 5: focusing spring, 501: parallel spring piece, 6: lens, 7: module housing, 8: sensor circuit board, 9: image sensor, 10: optical filter, and 11. centerline.

DETAILED DESCRIPTION

The technical solutions in the embodiments of the present disclosure are clearly and completely described below with reference to the drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

In the description of the present disclosure, it needs to be understood the orientation or positional relationships indicated by the terms "center", "upper", "lower", "front", "rear", "left", "right", "vertical", "horizontal", "top", "bottom", "inside", "outside", etc. are based on the orientation or positional relationship shown in the accompanying drawings, are merely for facilitating the description of the present disclosure and simplifying the description, rather than indicating or implying that an apparatus or element referred to must have a particular orientation or be constructed and operated in a particular orientation, and therefore will not be interpreted as limiting the present disclosure.

In the description of the present disclosure, it should be noted that, unless otherwise clearly specified, meanings of terms "install", "connected with", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art may understand the specific meanings of the above terms in the present disclosure based on specific situations.

Figure 1:
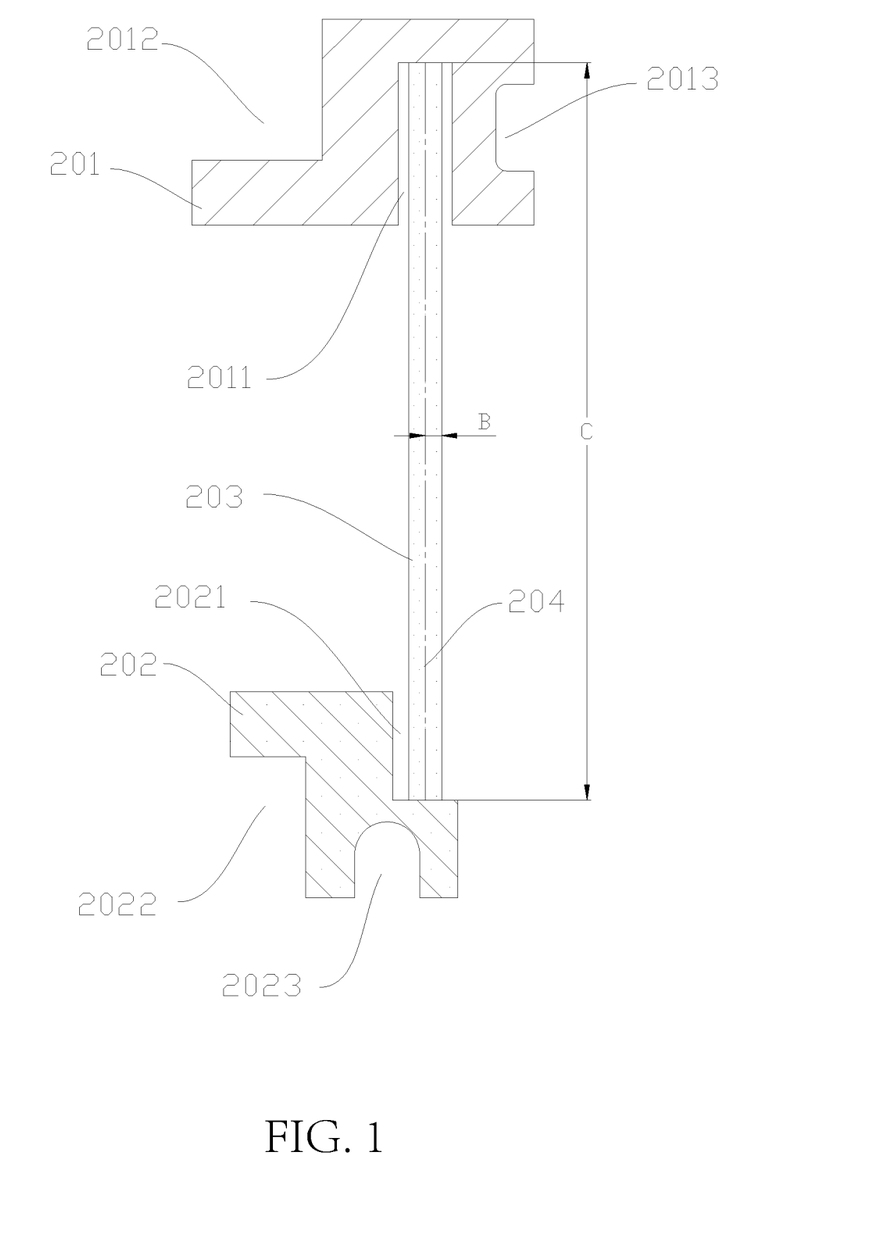
FIG. 1 is a schematic structural view of a stabilizing spring according to an embodiment of the present disclosure.
Figure 2:
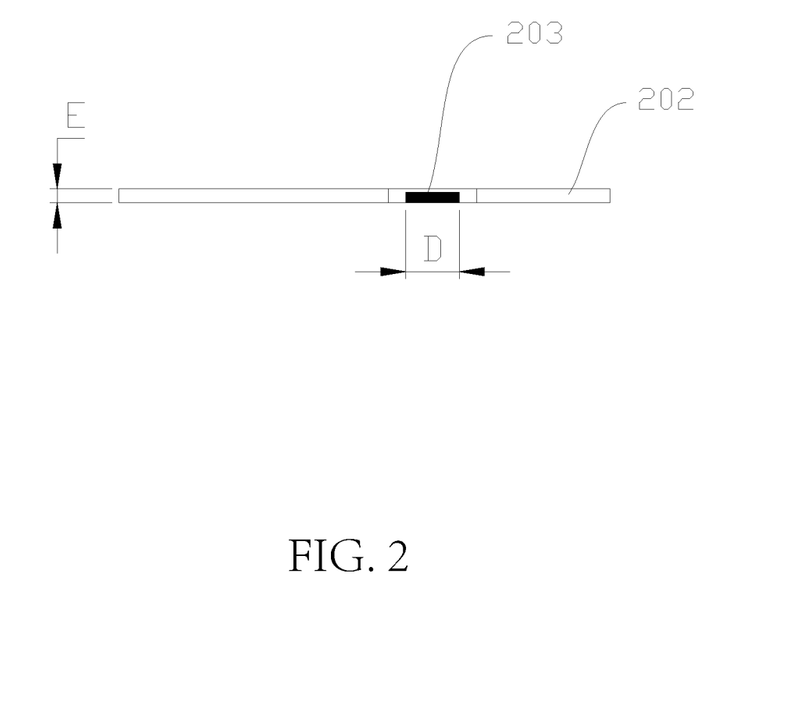
FIG. 2 is a cross-sectional view of a stabilizing spring according to an embodiment of the present disclosure.

Referring to FIG. 1 and FIG. 2, a preferred embodiment of the present disclosure provides a spring stabilizer system. The spring stabilizer system includes at least two stabilizing springs 2. The stabilizing springs 2 each include a fixed portion 201, an elastic connecting arm 203, and a movable arm 202. A first connecting groove 2011 is formed in the fixed portion 201. One end of the elastic connecting arm 203 is connected to the first connecting groove 2011. A ratio of a length C of a vertical midline 204 of the elastic connecting arm 203 to a maximum distance B from an edge of the elastic connecting arm to the vertical midline 204 is greater than 5:1. A ratio of a width D of the elastic connecting arm 203 to a thickness E of the elastic connecting arm is not less than 2:1. A second connecting groove 2021 is formed in the movable portion 202. The second connecting groove 2021 is connected to the other end of the elastic connecting arm 203.

Based on the above solution, when the spring stabilizer system is used, the fixed portion 201 of the stabilizing spring 2 is connected to a locating seat 101, while the movable portion 202 of the stabilizing spring 2 is connected to a sensor carrier 301. In response to a movement of the sensor carrier 301, the movable portion 202 of the stabilizing spring 2 moves with the sensor carrier 301, while the fixed portion 201 is fixedly connected to the locating seat 101. Since the elastic connecting arm 203 is elastic and deformable, the fixed portion 201 does not cause any movement to realize a movable connection between the sensor carrier 301 and the locating seat 101. Because of an elastic action of the elastic connecting arm 203, the elastic connecting arm 203 is restored when no force is applied to the sensor carrier 301, such that the sensor carrier 301 is reset, which is simple and convenient, and makes full use of an internal space of the device. In addition, when the device drops, the sensor carrier 301 can be cushioned fully for the elastic action of the elastic connecting arm 203 to achieve a better anti-drop ability.

As a preferred solution, of the two stabilizing springs, a ratio of the width D of the elastic connecting arm 203 of one of the stabilizing springs to the width D of the elastic connecting arm 203 of the other one of the stabilizing springs is not less than 10:9. Therefore, the stabilizing spring system can compensate elastic differences in different directions from other components to achieve a better stabilization effect.

Figure 8:
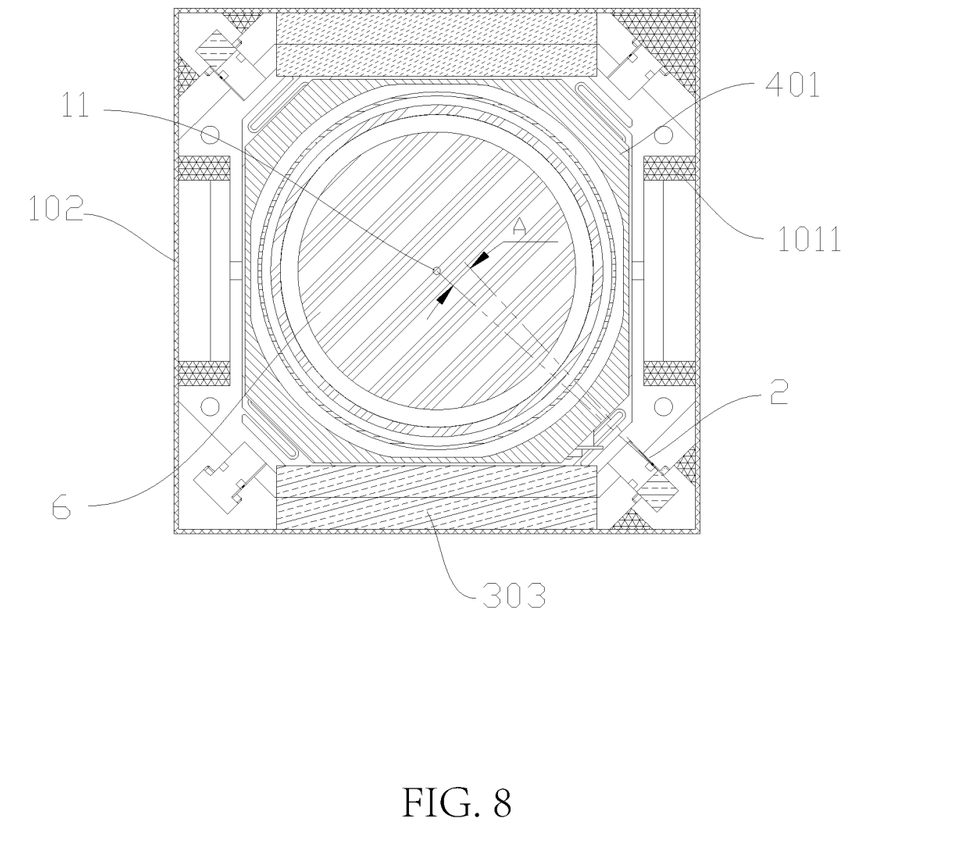
FIG. 8 is a horizontal cross-sectional view of a lens stabilizing-focusing device according to an embodiment of the present disclosure.

Referring to FIG. 8, as a preferred solution, the spring stabilizer system is provided with a centerline 11. An included angle between the vertical midline 204 of the stabilizing spring 2 and the centerline 11 is less than 10°. The centerline and the vertical midline 204 of the stabilizing spring 2 form a reference plane. A minimum included angle A between a plane where the stabilizing spring 2 is located and the reference plane is less than 20°. Therefore, with the stabilizing spring 2, the spring stabilizer system can effectively reduce a roll-axis spring constant (namely a spring constant in a turning direction around the optical axis), and compensate a large roll-axis spring constant caused by other elastic components (such as an elastic portion in a sensor circuit board), thereby achieving more desirable stabilization and power-saving effects in a roll axis.

As a preferred solution, the fixed portion 201 includes one side provided with a first locating groove 2012, and another side provided with a first clamping groove 2013. Specifically, the fixed portion 201 of the stabilizing spring 2 can be better fittingly connected to the locating seat 101 through the first locating groove 2012, and can be clamped onto the locating seat 101 through the first clamping groove 2013, such that the fixed portion 201 is connected more firmly.

As a preferred solution, the movable portion 202 includes one side provided with a second locating groove 2022 at a same side as the first locating groove 2012, and another side provided with a second clamping groove 2023 at a same side as the first clamping groove 2013. Specifically, the movable portion 202 of the stabilizing spring 2 can be better fittingly connected to the sensor carrier 301 through the second locating groove 2022, and can be clamped onto the sensor carrier 301 through the second clamping groove 2023, such that the movable portion 202 is connected more firmly.

Preferably, the elastic connecting arm 203 is a bar-shaped elastic connecting arm 203. Specifically, the bar-shaped elastic connecting arm 203 is tougher, and unlikely to break.

Figure 3:
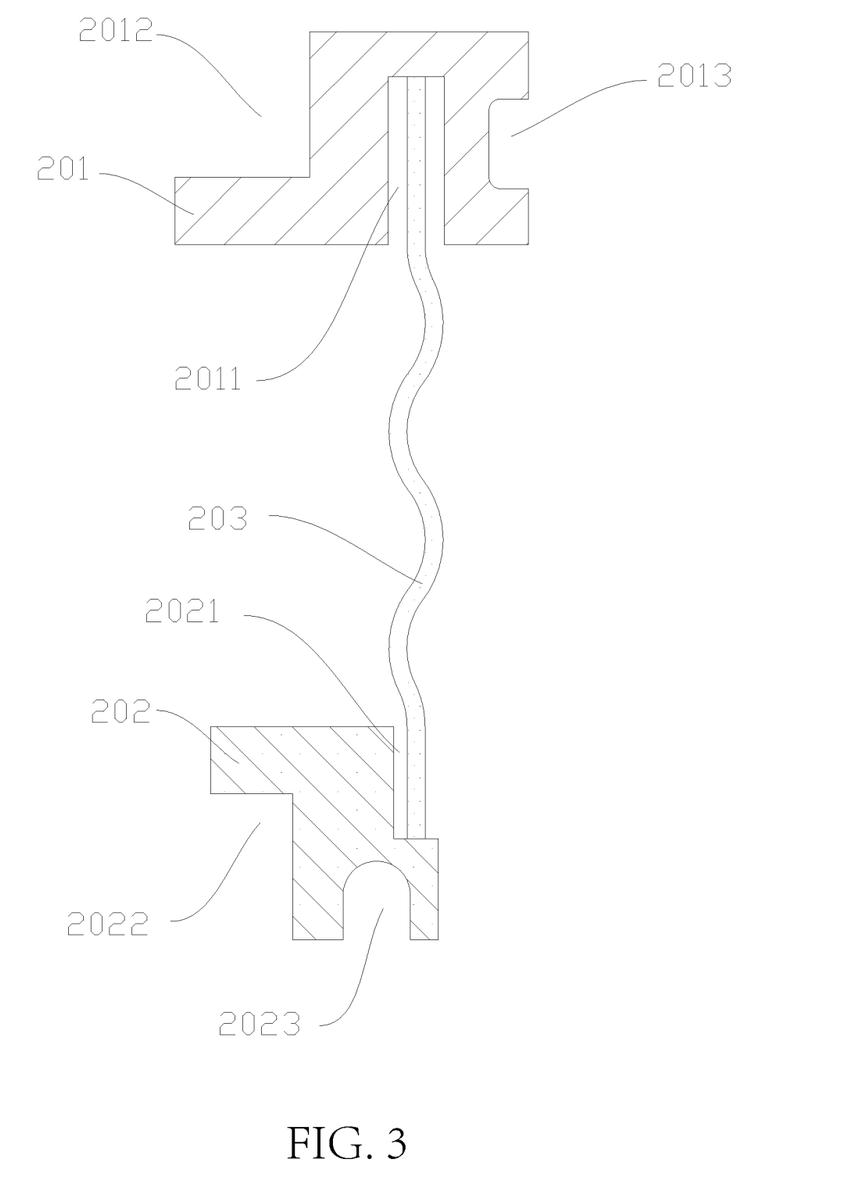
FIG. 3 is another schematic structural view of a stabilizing spring according to an embodiment of the present disclosure.
Figure 4:
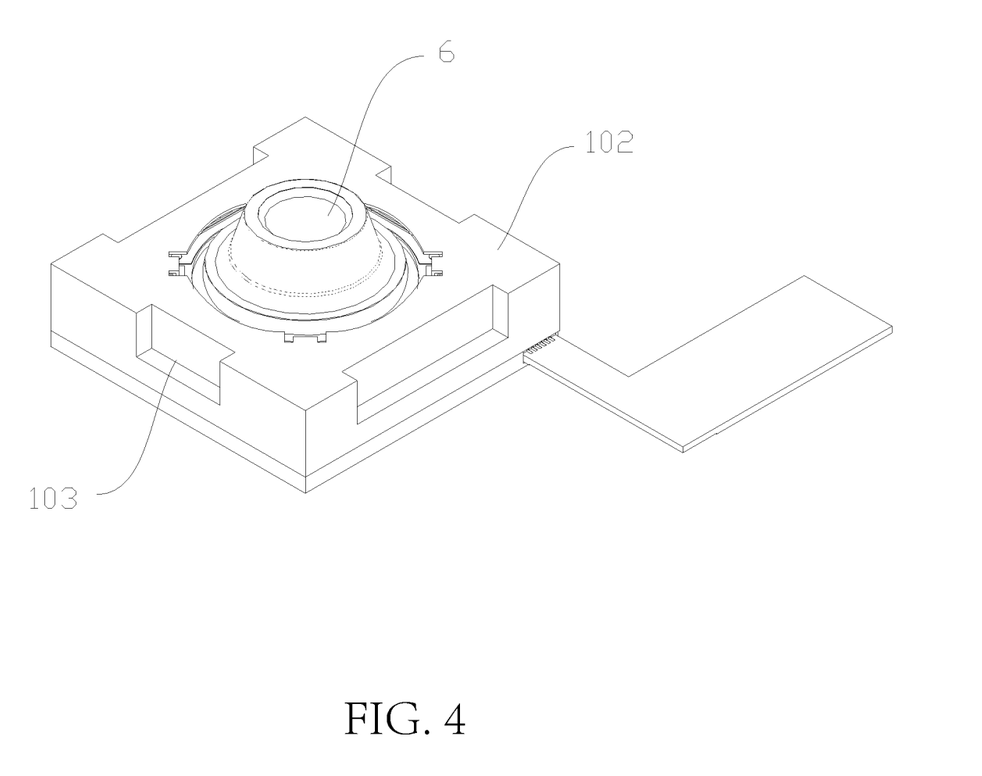
FIG. 4 is a schematic structural view of a lens stabilizing-focusing device according to an embodiment of the present disclosure.
Figure 5:
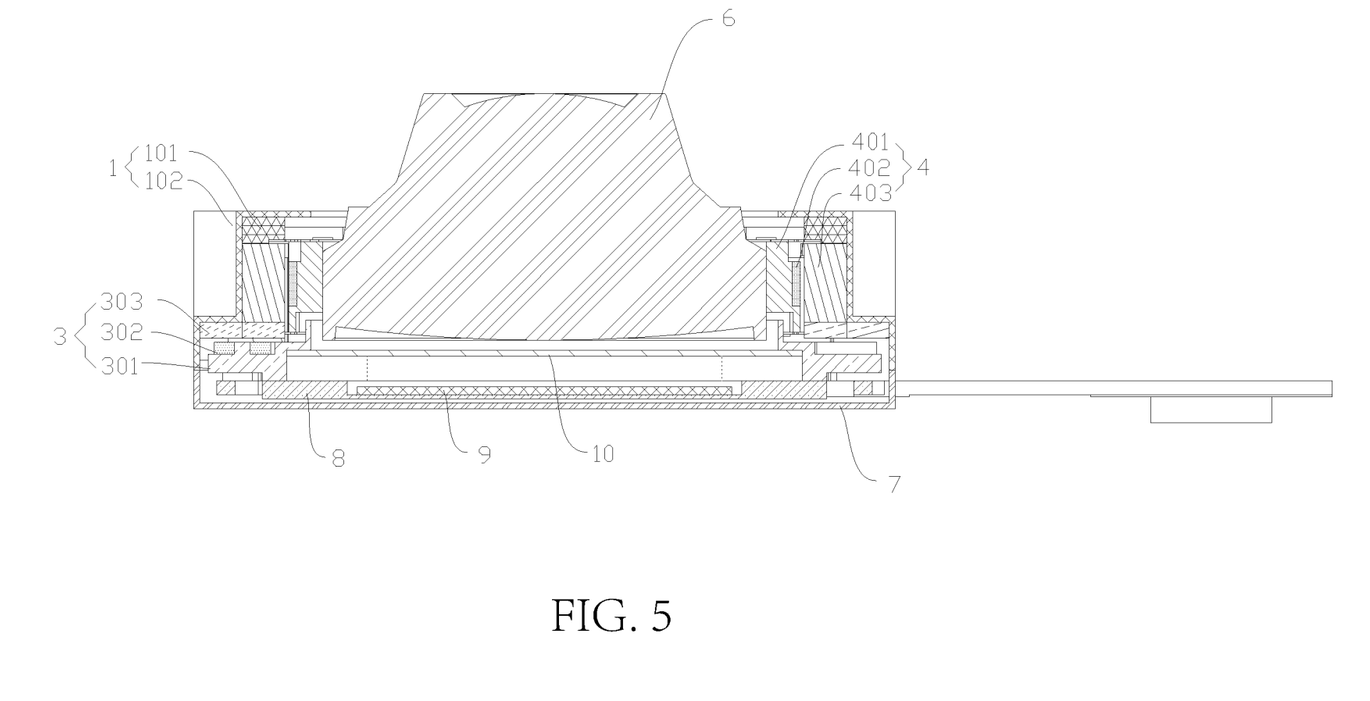
FIG. 5 is a vertical cross-sectional view of a lens stabilizing-focusing device according to an embodiment of the present disclosure.
Figure 6:
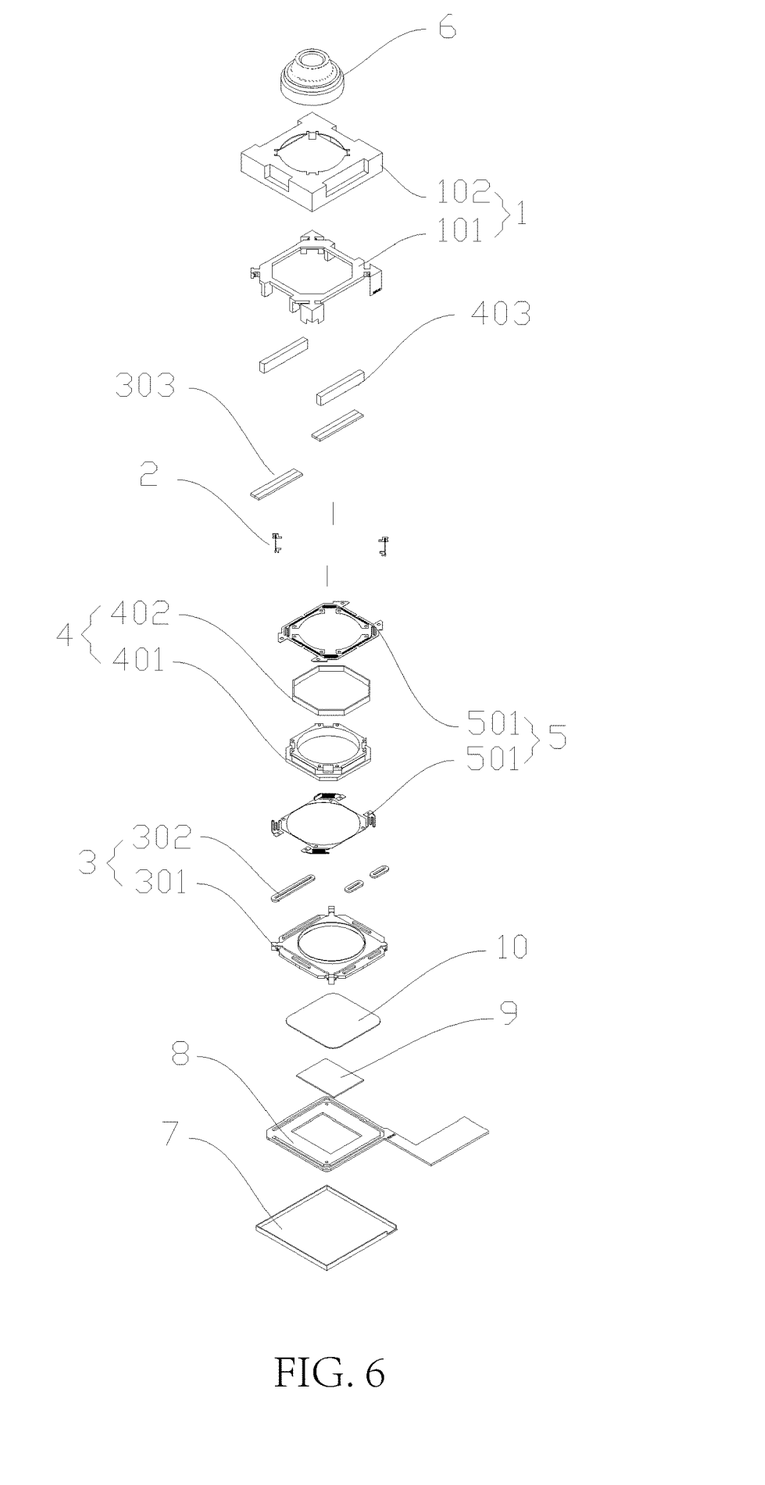
FIG. 6 is an exploded view of a lens stabilizing-focusing device according to an embodiment of the present disclosure.
Figure 7:
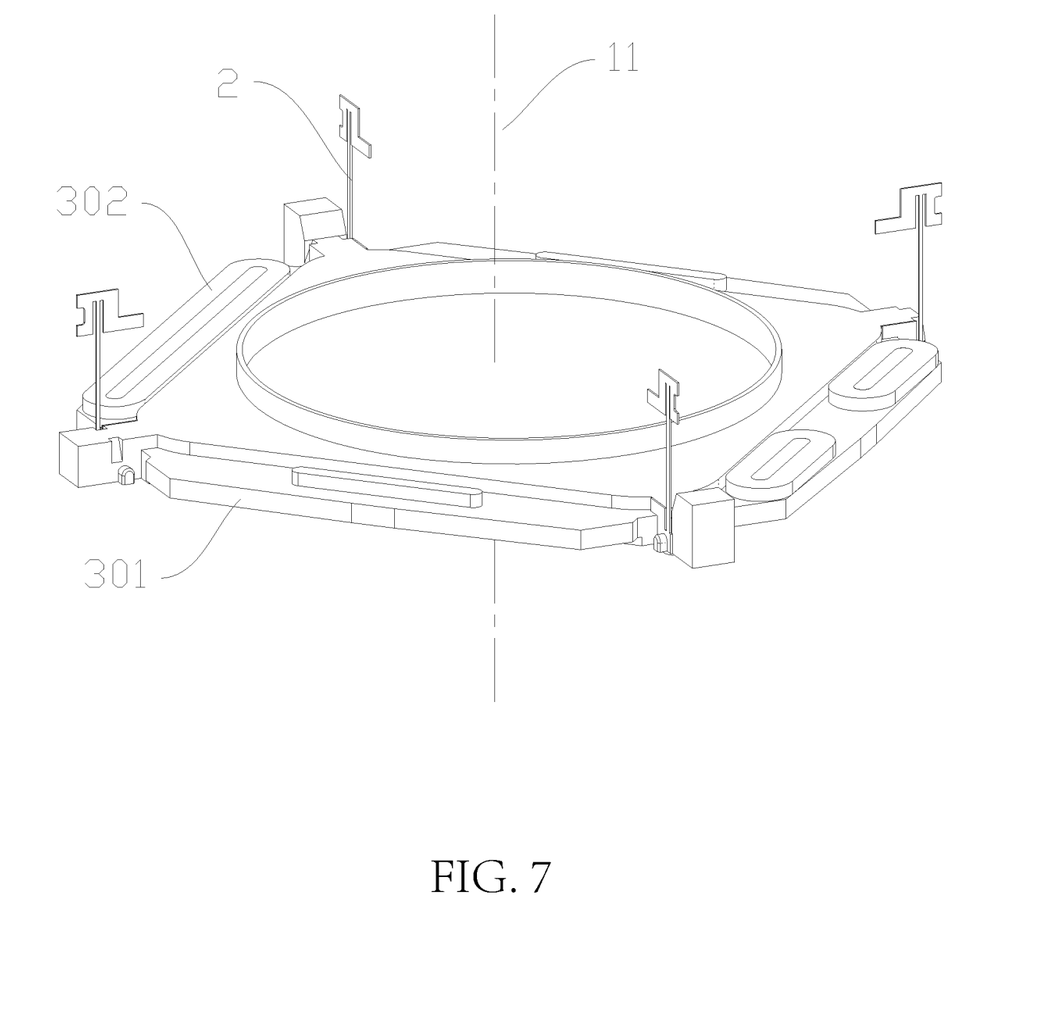
FIG. 7 is a schematic structural view of a mounting structure of a spring stabilizer system according to an embodiment of the present disclosure.

Referring to FIG. 3, as a preferred solution, the elastic connecting arm 203 is a wave-shaped elastic connecting arm 203. Specifically, the wave-shaped elastic connecting arm 203 has the better elasticity and stronger anti-drop ability.

As a preferred solution, the elastic connecting arm 203 is a sheet-shaped elastic connecting arm 203. Specifically, the sheet-shaped elastic connecting arm 203 can be adapted to a small mounting space, and is more flexible and convenient.

Referring to FIGS. 4-8, the present disclosure further provides a lens stabilizing-focusing device using the stabilizing spring system, including: a fixed structure 1, a stabilizing structure 3, a focusing structure 4, a lens 6, a module housing 7, a sensor circuit board 8, and an image sensor 9.

The fixed structure 1 includes a locating seat 101 and an outer casing 102. The locating seat 101 is provided in the outer casing 102.

The fixed portion 201 of the stabilizing spring 2 is connected to the locating seat 101.

The stabilizing structure 3 includes a sensor carrier 301, at least one set of stabilizing magnets 303, and at least two sets of stabilizing coils 302. The stabilizing magnets 303 are fixed in the outer casing 102. The sensor carrier 301 is connected to the movable portion 202 of the stabilizing spring 2. The stabilizing coils 302 are provided on the sensor carrier 301. The stabilizing coils 302 correspond to the stabilizing magnets 303. The stabilizing coils 302 are electrically connected to a conductive structure 1011.

The focusing structure 4 includes a lens carrier 401, at least one set of focusing magnets 403, and at least one set of focusing coils 402. The focusing magnets 403 are fixed on an inner wall of the outer casing 102. The lens carrier 401 is provided on the sensor carrier 301, and has at least a spatial translational DOF. The focusing coils 402 are provided at a periphery of the lens carrier 401. The focusing coils 402 are opposite to the focusing magnets 403. The focusing coils 402 are electrically connected to the conductive structure.

The lens is provided on the lens carrier 401. An included angle between the vertical midline of the elastic connecting arm 203 and an optical axis of the lens 6 is less than 10°.

The module housing 7 is connected to a bottom end of the fixed structure 1.

The sensor circuit board 8 is provided in the module housing 7, and connected to the fixed structure 1 and the stabilizing structure 3.

The image sensor 9 is provided on the sensor circuit board 8.

Based on the above solution, in response to stabilization in photographing, the stabilizing coils 302 are powered on. With an Ampere force generated by the powered stabilizing coils 302 in a magnetic field of the stabilizing magnets 303, the stabilizing coils 302 and the sensor carrier 301 are driven to move, namely the lens carrier 401 and the lens 6 are driven to move. In combination with an external or internal control driver chip, a direction and an amplitude of a current in the stabilizing coils 302 are controlled, thereby controlling an angle and a displacement of the sensor carrier 301, counteracting vibration interferences in photographing to eliminate the blur of the image, and improving a quality of the image or film. Upon completion of photographing, the stabilizing coils 302 are powered off. Because of the stabilizing spring 2, the sensor carrier 301 is reset. In response to focusing in photographing, the lens carrier 401 and the focusing coils 402 are driven under an Ampere force generated by the powered focusing coils 402 in a magnetic field of the focusing magnets 403. In combination with the external control driver chip, a direction and an amplitude of a current in the focusing coils 402 are controlled, thereby controlling a displacement of the lens carrier 401, and realizing an auto-focusing function of the lens 6.

As a preferred solution, the conductive structure is provided on the locating seat 101. The stabilizing spring 2 is made of a conductive material. The stabilizing spring 2 includes one end electrically connected to the sets of stabilizing coils 302, and the other end connected to the conductive structure 1011 on the locating seat 101. Specifically, the stabilizing coils 302 are directly connected to the conductive structure 1011 through the stabilizing spring 2, which ensures the use of the device, and simplifies the internal structure of the device because the stabilizing coils 302 and the conductive structure are unnecessarily connected by other components.

As a preferred solution, the outer casing 102 is a rectangular structure. Grooves 103 are formed in at least two side plates of the outer casing 102 respectively. Each set of stabilizing magnets 303 is correspondingly arranged on a bottom inner wall of one of the grooves 103. Each set of focusing magnets 403 is correspondingly arranged on a side inner wall of one of the grooves 103. Specifically, while effectively reducing a space for the motor and magnets, the grooves 103 can store other components such as the control driver chip and vibrating sensor. Therefore, the space is saved, and the cost of the magnets is reduced.

As a preferred solution, the lens stabilizing-focusing device includes at least one set of focusing springs 5. The set of focusing spring 5 includes two parallel spring pieces 501. The two parallel spring pieces 501 are respectively provided on and under the lens carrier 401. Specifically, with the parallel spring pieces 501, the lens carrier 401 is not collided with the outer casing 102 in focusing but cushioned well. The lens carrier 401 is reset upon completion of photographing.

As a preferred solution, the outer casing 102 is a rectangular structure. The stabilizing spring 2 is a sheet-shaped structure. Four stabilizing springs 2 are respectively provided at four corners of the outer casing 102. Specifically, by providing the stabilizing springs 2 at the four corners, the lens stabilizing-focusing device is mounted conveniently, and stressed uniformly, with a better stabilization effect.

As a preferred solution, the lens stabilizing-focusing device further includes an optical filter 10. The optical filter 10 is connected to a bottom surface of the sensor carrier 301.

As a preferred solution, the optical axis of the lens coincides with the centerline of the spring system.

In conclusion, the spring stabilizer system and the lens stabilizing-focusing device using the spring stabilizer system provided by the preferred embodiment of the present disclosure achieve the following effects over the prior art:

(1) The fixed portion 201 is connected to the movable portion 202 through the elastic connecting arm 203, which facilitates a camera module to realize a multi-axis DOF, and reduces a spring constant and stabilizing power consumption.

(2) The stabilizing spring 2 system provided by the present disclosure is provided with the fixed portion 201, which can be connected to the fixed structure 1 in the camera module. Without compromising the DOF of the movable portion 202, the stability and anti-drop ability of the whole circuit board structure are ensured, and the reliability in the case of the drop is further enhanced.

(3) The lens stabilizing-focusing device provided by the present disclosure involves neither complicated production such as excessive laser cutting, nor complicated assembly, thereby reducing the production cost and reject ratio, and improving the production efficiency.

(4) The present disclosure makes full use of a limited space of the device, with a smaller size, a simpler structure, and a lower cost.

(5) The spring system in the present disclosure can effectively reduce a roll-axis spring constant, and compensate a large roll-axis spring constant caused by other elastic components (such as an elastic portion in a sensor circuit board), thereby achieving more desirable stabilization and power-saving effects in a roll axis.

The above are only preferred implementations of the present disclosure. It should be noted that several improvements and replacements may further be made by a person of ordinary skill in the art without departing from the principle of the present disclosure, and such improvements and replacements should also be deemed as falling within the protection scope of the present disclosure.

The invention claimed is:

1. A spring stabilizer system, comprising at least two stabilizing springs, wherein the stabilizing springs each comprise:
   a fixed portion, wherein a first connecting groove is formed in the fixed portion;
   an elastic connecting arm, wherein one end of the elastic connecting arm is connected to the first connecting groove; a ratio of a length of a vertical midline of the elastic connecting arm to a maximum distance from an edge of the elastic connecting arm to the vertical midline is greater than 5:1; and a ratio of a width of the elastic connecting arm to a thickness of the elastic connecting arm is not less than 2:1; and a movable portion, wherein a second connecting groove is formed in the movable portion;
and the second connecting groove is connected to another end of the elastic connecting arm; wherein
the spring stabilizer system is provided with a centerline; an included angle between the vertical midline of the stabilizing spring and the centerline is less than 10°; the centerline and the vertical midline of the stabilizing spring form a reference plane; and a minimum included angle between a plane where the stabilizing spring is located and the reference plane is less than 20°.

2. The spring stabilizer system according to claim 1, wherein of the at least two stabilizing springs, a ratio of the width of the elastic connecting arm of one of the stabilizing springs to the width of the elastic connecting arm of the other one of the stabilizing springs is not less than 10:9.

3. The spring stabilizer system according to claim 1, wherein the fixed portion comprises one side provided with a first locating groove, and another side provided with a first clamping groove; and the movable portion comprises one side provided with a second locating groove at a same side as the first locating groove, and another side provided with a second clamping groove at a same side as the first clamping groove.

4. The spring stabilizer system according to claim 1, wherein the elastic connecting arm is a bar-shaped elastic connecting arm.

5. The spring stabilizer system according to claim 1, wherein the elastic connecting arm is a wave-shaped elastic connecting arm.

6. The spring stabilizer system according to claim 1, wherein the elastic connecting arm is a sheet-shaped elastic connecting arm.

7. A lens stabilizing-focusing device using the spring stabilizer system according to claim 1, comprising:
a fixed structure comprising a locating seat and an outer casing, wherein the locating seat is provided in the outer casing; and
the fixed portion of each of the stabilizing springs is connected to the locating seat;
a stabilizing structure comprising a sensor carrier, at least one set of stabilizing magnets, and at least two sets of stabilizing coils, wherein the stabilizing magnets are fixed in the outer casing; the sensor carrier is connected to the movable portion of the stabilizing spring; the stabilizing coils are provided on the sensor carrier; and the stabilizing coils correspond to the stabilizing magnets;
a focusing structure comprising a lens carrier, at least one set of focusing magnets, and at least one set of focusing coils, wherein the focusing magnets are fixed on an inner wall of the outer casing; the lens carrier is provided on the sensor carrier, and has at least a spatial translational degree-of-freedom (DOF); the focusing coils are provided at a periphery of the lens carrier; and the focusing coils are opposite to the focusing magnets;
a lens provided on the lens carrier, wherein an included angle between the vertical midline of the elastic connecting arm and an optical axis of the lens is less than 10°;
a module housing connected to a bottom end of the fixed structure;
a sensor circuit board provided in the module housing, and connected to the fixed structure and the stabilizing structure; and
an image sensor provided on the sensor circuit board.

8. A lens stabilizing-focusing device using the spring stabilizer system according to claim 2, comprising:
a fixed structure comprising a locating seat and an outer casing, wherein the locating seat is provided in the outer casing; and
the fixed portion of each of the stabilizing springs is connected to the locating seat;
a stabilizing structure comprising a sensor carrier, at least one set of stabilizing magnets, and at least two sets of stabilizing coils, wherein the stabilizing magnets are fixed in the outer casing; the sensor carrier is connected to the movable portion of the stabilizing spring; the stabilizing coils are provided on the sensor carrier; and the stabilizing coils correspond to the stabilizing magnets;
a focusing structure comprising a lens carrier, at least one set of focusing magnets, and at least one set of focusing coils, wherein the focusing magnets are fixed on an inner wall of the outer casing; the lens carrier is provided on the sensor carrier, and has at least a spatial translational degree-of-freedom (DOF); the focusing coils are provided at a periphery of the lens carrier; and the focusing coils are opposite to the focusing magnets;
a lens provided on the lens carrier, wherein an included angle between the vertical midline of the elastic connecting arm and an optical axis of the lens is less than 10°;
a module housing connected to a bottom end of the fixed structure;
a sensor circuit board provided in the module housing, and connected to the fixed structure and the stabilizing structure; and
an image sensor provided on the sensor circuit board.

9. A lens stabilizing-focusing device using the spring stabilizer system according to claim 3, comprising:
a fixed structure comprising a locating seat and an outer casing, wherein the locating seat is provided in the outer casing; and
the fixed portion of each of the stabilizing springs is connected to the locating seat;
a stabilizing structure comprising a sensor carrier, at least one set of stabilizing magnets, and at least two sets of stabilizing coils, wherein the stabilizing magnets are fixed in the outer casing; the sensor carrier is connected to the movable portion of the stabilizing spring; the stabilizing coils are provided on the sensor carrier; and the stabilizing coils correspond to the stabilizing magnets;
a focusing structure comprising a lens carrier, at least one set of focusing magnets, and at least one set of focusing coils, wherein the focusing magnets are fixed on an inner wall of the outer casing; the lens carrier is provided on the sensor carrier, and has at least a spatial translational degree-of-freedom (DOF); the focusing coils are provided at a periphery of the lens carrier; and the focusing coils are opposite to the focusing magnets;
a lens provided on the lens carrier, wherein an included angle between the vertical midline of the elastic connecting arm and an optical axis of the lens is less than 10°;
a module housing connected to a bottom end of the fixed structure;
a sensor circuit board provided in the module housing, and connected to the fixed structure and the stabilizing structure; and
an image sensor provided on the sensor circuit board.

10. A lens stabilizing-focusing device using the spring stabilizer system according to claim 4, comprising:
- a fixed structure comprising a locating seat and an outer casing, wherein the locating seat is provided in the outer casing; and
- the fixed portion of each of the stabilizing springs is connected to the locating seat;
- a stabilizing structure comprising a sensor carrier, at least one set of stabilizing magnets, and at least two sets of stabilizing coils, wherein the stabilizing magnets are fixed in the outer casing; the sensor carrier is connected to the movable portion of the stabilizing spring; the stabilizing coils are provided on the sensor carrier; and the stabilizing coils correspond to the stabilizing magnets;
- a focusing structure comprising a lens carrier, at least one set of focusing magnets, and at least one set of focusing coils, wherein the focusing magnets are fixed on an inner wall of the outer casing; the lens carrier is provided on the sensor carrier, and has at least a spatial translational degree-of-freedom (DOF); the focusing coils are provided at a periphery of the lens carrier; and the focusing coils are opposite to the focusing magnets;
- a lens provided on the lens carrier, wherein an included angle between the vertical midline of the elastic connecting arm and an optical axis of the lens is less than 10°;
- a module housing connected to a bottom end of the fixed structure;
- a sensor circuit board provided in the module housing, and connected to the fixed structure and the stabilizing structure; and
- an image sensor provided on the sensor circuit board.

11. A lens stabilizing-focusing device using the spring stabilizer system according to claim 5, comprising:
- a fixed structure comprising a locating seat and an outer casing, wherein the locating seat is provided in the outer casing; and
- the fixed portion of each of the stabilizing springs is connected to the locating seat;
- a stabilizing structure comprising a sensor carrier, at least one set of stabilizing magnets, and at least two sets of stabilizing coils, wherein the stabilizing magnets are fixed in the outer casing; the sensor carrier is connected to the movable portion of the stabilizing spring; the stabilizing coils are provided on the sensor carrier; and the stabilizing coils correspond to the stabilizing magnets;
- a focusing structure comprising a lens carrier, at least one set of focusing magnets, and at least one set of focusing coils, wherein the focusing magnets are fixed on an inner wall of the outer casing; the lens carrier is provided on the sensor carrier, and has at least a spatial translational degree-of-freedom (DOF); the focusing coils are provided at a periphery of the lens carrier; and the focusing coils are opposite to the focusing magnets;
- a lens provided on the lens carrier, wherein an included angle between the vertical midline of the elastic connecting arm and an optical axis of the lens is less than 10°;
- a module housing connected to a bottom end of the fixed structure;
- a sensor circuit board provided in the module housing, and connected to the fixed structure and the stabilizing structure; and
- an image sensor provided on the sensor circuit board.

12. A lens stabilizing-focusing device using the spring stabilizer system according to claim 6, comprising:
- a fixed structure comprising a locating seat and an outer casing, wherein the locating seat is provided in the outer casing; and
- the fixed portion of each of the stabilizing springs is connected to the locating seat;
- a stabilizing structure comprising a sensor carrier, at least one set of stabilizing magnets, and at least two sets of stabilizing coils, wherein the stabilizing magnets are fixed in the outer casing; the sensor carrier is connected to the movable portion of the stabilizing spring; the stabilizing coils are provided on the sensor carrier; and the stabilizing coils correspond to the stabilizing magnets;
- a focusing structure comprising a lens carrier, at least one set of focusing magnets, and at least one set of focusing coils, wherein the focusing magnets are fixed on an inner wall of the outer casing; the lens carrier is provided on the sensor carrier, and has at least a spatial translational degree-of-freedom (DOF); the focusing coils are provided at a periphery of the lens carrier; and the focusing coils are opposite to the focusing magnets;
- a lens provided on the lens carrier, wherein an included angle between the vertical midline of the elastic connecting arm and an optical axis of the lens is less than 10°;
- a module housing connected to a bottom end of the fixed structure;
- a sensor circuit board provided in the module housing, and connected to the fixed structure and the stabilizing structure; and
- an image sensor provided on the sensor circuit board.

13. The lens stabilizing-focusing device according to claim 7, wherein a conductive structure is provided on the locating seat; the stabilizing spring is made of a conductive material; the stabilizing spring comprises one end electrically connected to the sets of the stabilizing coils, and the other end connected to the conductive structure on the locating seat.

14. The lens stabilizing-focusing device according to claim 8, wherein a conductive structure is provided on the locating seat; the stabilizing spring is made of a conductive material; the stabilizing spring comprises one end electrically connected to the sets of the stabilizing coils, and the other end connected to the conductive structure on the locating seat.

15. The lens stabilizing-focusing device according to claim 9, wherein a conductive structure is provided on the locating seat; the stabilizing spring is made of a conductive material; the stabilizing spring comprises one end electrically connected to the sets of the stabilizing coils, and the other end connected to the conductive structure on the locating seat.

16. The lens stabilizing-focusing device according to claim 11, wherein a conductive structure is provided on the locating seat; the stabilizing spring is made of a conductive material; the stabilizing spring comprises one end electrically connected to the sets of the stabilizing coils, and the other end connected to the conductive structure on the locating seat.

17. The lens stabilizing-focusing device according to claim 7, wherein the optical axis of the lens coincides with the centerline of the spring stabilizer system.

* * * * *